(12) United States Patent
Nicholson

(10) Patent No.: US 8,818,709 B2
(45) Date of Patent: *Aug. 26, 2014

(54) AUGMENTED REALITY SHOPPER ROUTING

(71) Applicant: International Business Machines Corporation, Armonk, NY (US)

(72) Inventor: Robert B. Nicholson, Southsea (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,528

(22) Filed: Sep. 30, 2013

(65) Prior Publication Data

US 2014/0032360 A1 Jan. 30, 2014

Related U.S. Application Data

(63) Continuation of application No. 13/035,912, filed on Feb. 25, 2011.

(30) Foreign Application Priority Data

Mar. 31, 2010 (EP) .................................. 10158742

(51) Int. Cl.
*G01C 21/00* (2006.01)

(52) U.S. Cl.
USPC ......................................... 701/410; 701/400

(58) Field of Classification Search
USPC .................................................. 701/400, 410
See application file for complete search history.

(56) References Cited

U.S. PATENT DOCUMENTS

| 6,123,259 | A | 9/2000 | Ogasawara |
| 2005/0177446 | A1 | 8/2005 | Hoblit |
| 2005/0256782 | A1 | 11/2005 | Sands et al. |
| 2006/0089878 | A1 | 4/2006 | Roberts et al. |
| 2008/0071559 | A1 | 3/2008 | Arrasvuori |
| 2008/0308630 | A1 | 12/2008 | Bhogal et al. |
| 2008/0312815 | A1 | 12/2008 | Stoler |
| 2009/0012704 | A1 | 1/2009 | Franco et al. |
| 2010/0198626 | A1 | 8/2010 | Cho et al. |
| 2011/0144908 | A1 | 6/2011 | Cheong |
| 2011/0246064 | A1* | 10/2011 | Nicholson ...................... 701/206 |

OTHER PUBLICATIONS

Augmented reality—Wikipedia, the free encyclopedia, Dec. 21, 2010; http://en.wikipedia.org/wiki/Augmented_reality.

(Continued)

*Primary Examiner* — Hussein A. Elchanti
(74) *Attorney, Agent, or Firm* — North Shore Patents, P.C.; Michele Liu Baillie

(57) ABSTRACT

A store routing system for guiding a shopper in a store comprises a storage storing a store product map comprising location information for products available at the store. The system also comprises an analytics engine for identifying one or more recommended products for the shopper based on a set of one or more sought products. The system also comprises a route calculator for calculating a route through the store to a location of each of the sought products based on the store product map and for including a waypoint in the route corresponding to a location of each of the one or more recommended products.

9 Claims, 6 Drawing Sheets

(56) References Cited

OTHER PUBLICATIONS

Parviz, Babak A., "Augmented Reality in a Contact Lens," IEEE Spectrum, Sep. 2009; http://spectrum.ieee.org/biomedical/bionics/augmented-reality-in-a-contact-lens/0.

Augmented Reality—Layar Reality Browser, 2010; http://layar.com/.

Zhu, Wei et al., "Design of the PromoPad: an Automated Augmented Reality Shopping Assistant," 12th Americas Conference on Information Systems, pp. 1-16, Aug. 4-6, 2006, Acapulco, Mexico.

Zhu, Wei et al., "Personalized In-store E-Commerce with the PromoPad: an Augmented Reality Shopping Assistant," Michigan State University, pp. 1-19, vol. 1 No. 3, Feb. 2004.

\* cited by examiner

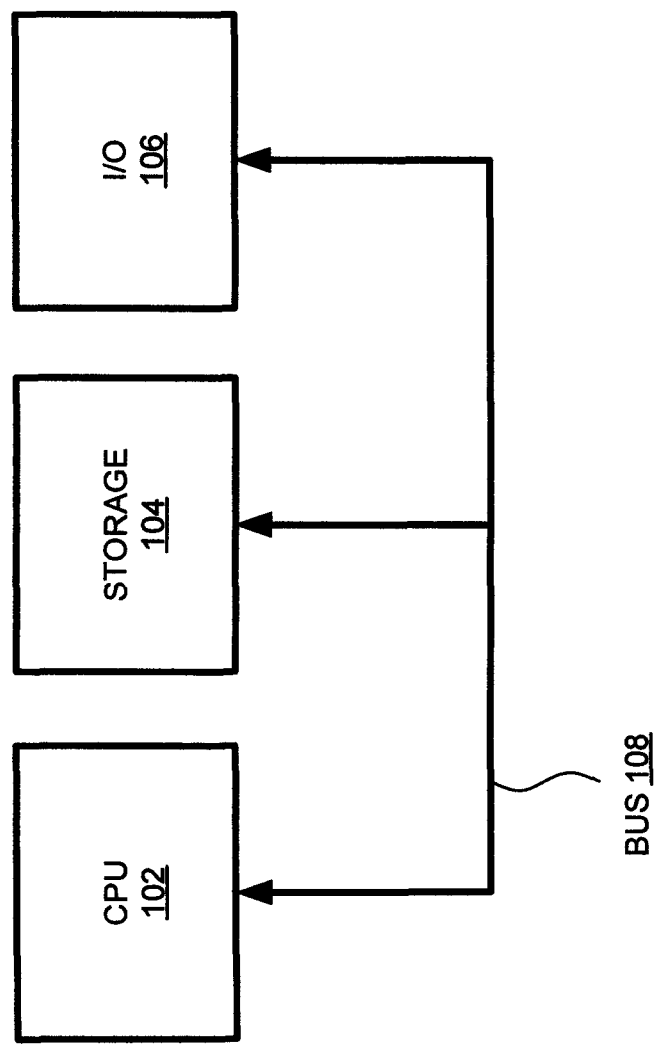

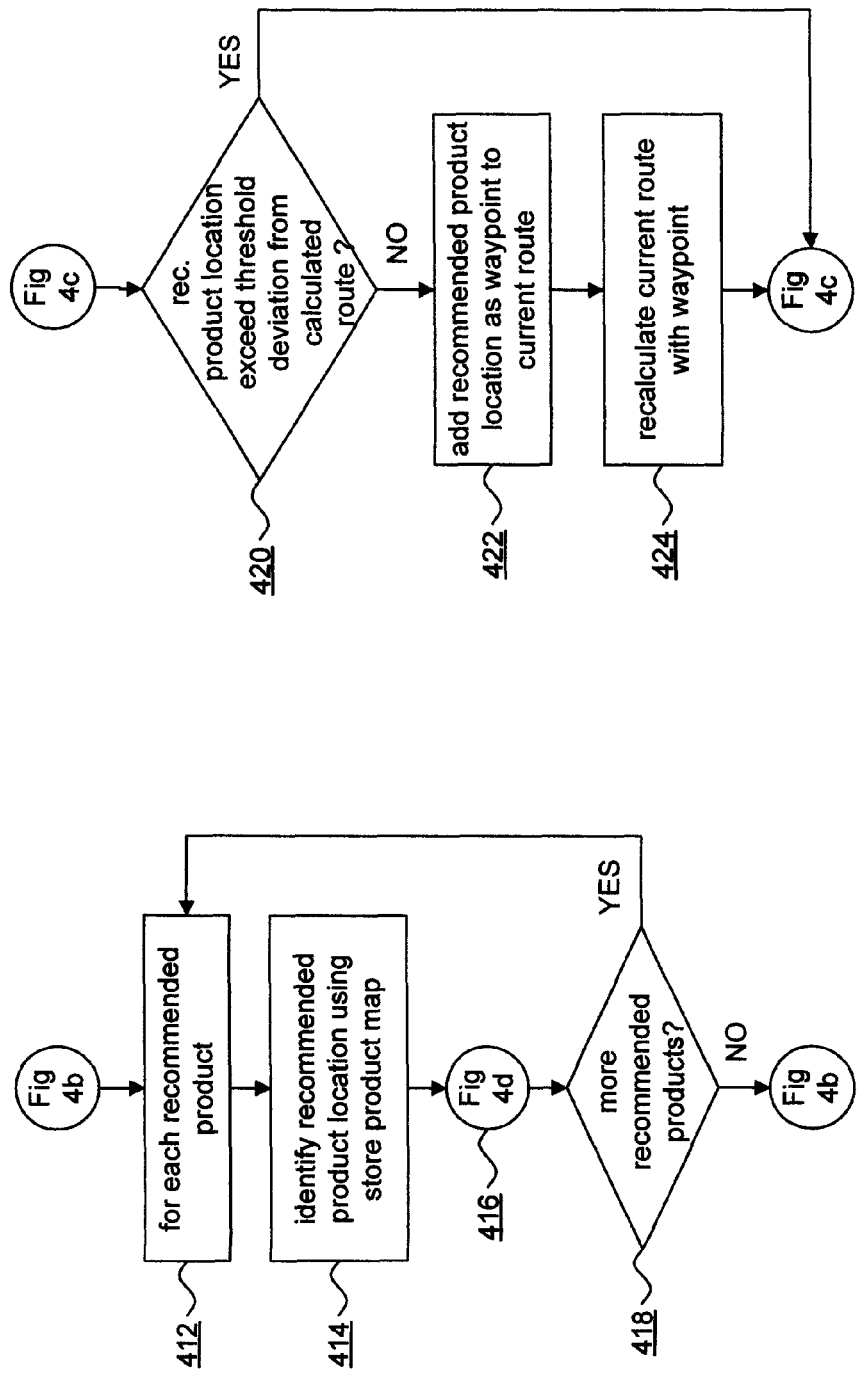

AUGMENTED REALITY SHOPPER ROUTING

CROSS-REFERENCE TO RELATED APPLICATIONS

The present application claims priority to European Patent Application No. 10158742.6, filed on Mar. 31, 2010, and is a continuation of co-pending U.S. patent application Ser. No. 13/035,912, filed on Feb. 25, 2011.

BACKGROUND

1. Field of the Invention

The present invention relates to an augmented reality routing system. In particular, it relates to a routing system for guiding a shopper in a shopping store.

2. Background of the Invention

The ongoing development and growing availability of portable devices providing increasing levels of computing ability, increasing memory capacity, increasingly sophisticated input, output and human interfaces and high levels of connectivity provide the capability for new and powerful user applications. Examples include smartphones, portable media players, personal digital assistants, palmtop computers, mini notebook computers, satellite navigation devices and the like. Such devices are typically implemented as computer platforms having one or more processors, volatile and/or non-volatile storage, intuitive user interfaces and network capability such as wireless networking. Devices are also increasingly provided with audio and video input and output facilities and location determination technology such as a global positioning system.

The availability of such increasingly generalized devices has seen a rapid growth of new and useful applications drawing on their portable nature, their ability to interact with the real world via cameras, microphones, speakers and wired and wireless networks, and their generalized nature allowing the execution of new software. One such emerging application is in the field of augmented reality in which a current live view of a user of a device as received via a camera is presented on a display of the device augmented by computer generated text or images. One application of augmented reality is advertising whereby advertisements can be overlaid on a live view captured by camera to indicate the availability of products of services in vicinity. Another application of augmented reality devices is in support of complex processes such as engineering maintenance tasks or even medical procedures. Here, augmented reality technology can present guidance and instructions graphically overlaid on a live video image of work in progress.

A further application of augmented reality is in the provision of navigational guidance, such as part of a satellite navigation system. Augmented reality is particularly beneficial in the provision of navigation guidance due to the convergence of a live view of a user overlaid directly with relevant navigation guidance. Thus, a user is able to relate the guidance directly to what can be seen and the potential for ambiguity in the guidance is greatly reduced. The use of augmented reality for navigation guidance is particularly useful for route planning in situations where viewing a screen of a device is not unduly distracting, such as for routes intended to be followed in a pedestrian manner or similar.

The application of augmented reality technology to such route planning applications has been adopted in shopping store settings. The paper "Personalized In-store E-Commerce with the PromoPad: an Augmented Reality Shopping Assistant" (Zhu et al., Electronic Journal for E-commerce Tools and Applications, 2004) describes the use of an augmented reality device to provide assistance to shoppers in a shopping store. The PromoPad device allows shoppers to optimize their shopping route in a store to quickly find items they plan to buy. The items may be known in advance, or categories of item (such as clearance items) may be located using the PromoPad. The PromoPad is also used to "augment" and "diminish" product information for products based on shopper profile information.

The route guidance offered by a product such as PromoPad is static in the sense that the user is provided guidance to reach a predetermined destination and a shortest or quickest route is taken. Further, the opportunities to augment and diminish product information for a shopper are identified based on shopper profile information. Such facilities cannot be afforded to shoppers for which no such profile information exists or where such information is not rich enough to discern an appropriate level or nature of augmentation.

BRIEF SUMMARY

The present invention accordingly provides, in a first aspect, a method for guiding a shopper in a store, comprising: receiving one or more recommended products identified for the shopper based on a set of one or more sought products; calculating a route through the store to a location of each of the sought products based on a store product map, the store product map comprising location information for products available at the store; and including a waypoint in the route corresponding to a location of each of the one or more recommended products.

In one aspect, the method further comprises: receiving additional recommended products identified based product information for on the one or more products consuming the shopper's attention.

The present invention accordingly provides, in a second aspect, a computer program product comprising computer program code, which when executed by a computer, cause the computer to: receive one or more recommended products identified for the shopper based on a set of one or more sought products; calculate a route through the store to a location of each of the sought products based on a store product map, the store product map comprising location information for products available at the store; and include a waypoint in the route corresponding to a location of each of the one or more recommended products.

The present invention accordingly provides, in a third aspect, a store routing system for guiding a shopper in a store, comprising: a storage storing a store product map comprising location information for products available at the store; an analytics engine for identifying one or more recommended products for the shopper based on a set of one or more sought products; a route calculator for calculating a route through the store to a location of each of the sought products based on the store product map and for including a waypoint in the route corresponding to a location of each of the one or more recommended products.

In one aspect, the store routing system further comprises: an attention sink identifier for generating product information relating to one or more products consuming the shopper's attention; and the analytics engine further for identifying the one or more recommended products based additionally on the one or more products consuming the shopper's attention.

BRIEF DESCRIPTION OF THE SEVERAL VIEWS OF THE DRAWINGS

An embodiment of the present invention is described below in more detail, by way of example only, with reference to the accompanying drawings, in which:

FIG. 1 is a block diagram of a computer system suitable for the operation of embodiments of the present invention;

FIGS. 4b, 4c and 4d together are a flowchart of a method of the route calculator of FIG. 2a or FIG. 3a in accordance with an embodiment of the present invention.

DETAILED DESCRIPTION

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2B:
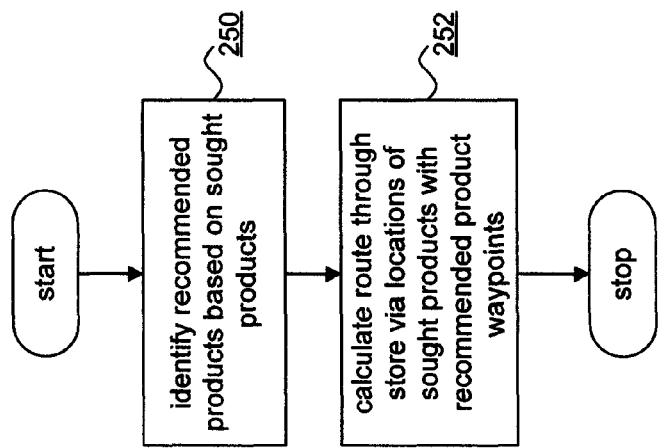
FIG. 2b is a flowchart of a method of the store routing system of FIG. 2a in accordance with an embodiment of the present invention.
Figure 2A:
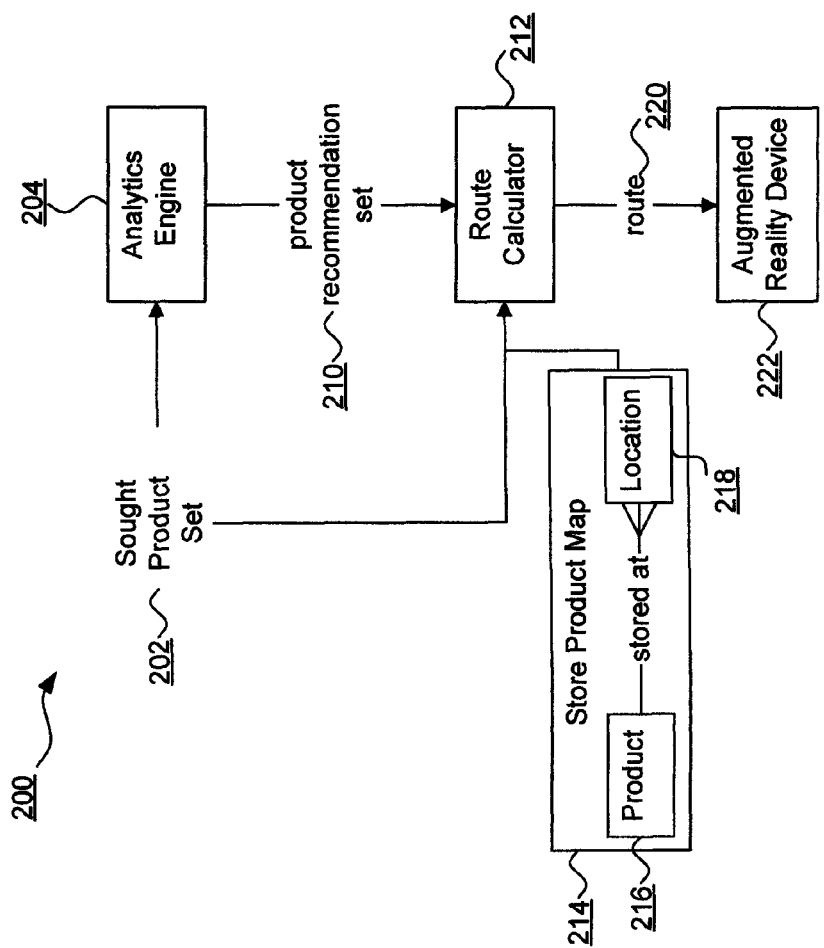
FIG. 2a is a block diagram of an arrangement of a store routing system for guiding a shopper in a shopping store including an augmented reality device for presenting a route to the shopper in accordance with an embodiment of the present invention.

FIG. 2a is a block diagram of an arrangement of a store routing system 200 for guiding a shopper in a shopping store including an augmented reality device 222 for presenting a route 220 to the shopper in accordance with an embodiment of the present invention. The augmented reality device 222 provides augmented reality facilities including a camera for obtaining a current view of a shopper, functions to determine (or to gather information to determine) a current location and orientation of the augmented reality device 222 and a display for presenting a route to the shopper in conjunction with a representation of a current view of the shopper in a store.

In the arrangement of FIG. 2a, the augmented reality device 222 is used to present to a shopper a route 220 to each product in a set of sought products 202 and a set of product recommendations 210. The set of sought products 202 include products indicated as being sought by input from, for example, the shopper. The input can be received via the augmented reality device 222 or via any other suitable means such as, for example, in advance by an online service, with reference to a pre-existing shopping list or with reference to a recipe. The set of product recommendations is identified by the analytics engine 204 based on the set of sought products.

The analytics engine 204 comprises an apparatus or generalized programmable device and appropriate programming logic for identifying product recommendations for a shopper based on the set of sought products 202. The set of recommended products 210 can be determined based on techniques known in the art such as processes of up-selling (whereby a product known to be of interest to the shopper is upgraded, enhanced or supplemented by one or more alternative or additional recommended products) or cross-selling (whereby a product known to be of interest to the shopper is supplemented by one or more supplementary, complementary or otherwise related additional recommended products).

The analytics engine 204 can also be operable to employ an analytical approach to identify additional products for inclusion in the set of recommended products 210. For example, in cases where the sought product set 202 constitutes a substantial part of a list of commonly co-purchased products, any products apparently missing from the list can be identified by the analytics engine 204 as recommended products in the set 210. The identification of such relationships between products is well known in the art and already informs such processes as store layout design, in-store product arrangements and seasonal promotions. In the context of embodiments of the present invention, the approach can be put to significantly more effective use since the physical design of the store or product arrangements need not be affected to achieve the beneficial effects of related product cross-selling for the store and the customer due to the use of the augmented reality device 222 in guiding the shopper.

The route calculator 212 of FIG. 2a comprises an apparatus or generalized programmable device and appropriate programming logic for calculating a route 220 through a store via each of the products in the set of sought products 202. Such route calculators are known in the art such as in satellite navigation software and devices. The route calculator 212 determines a physical location within a store of each product in the set of sought products 202 using a store product map 214. The store product map 214 is a hardware or software device or data structure storing information relating to products 216 stored in a store including a physical location 218 of each of the products 216 within the store. Thus, using the store product map 214 and the set of sought products 202, the route calculator 212 is operable to calculate an appropriate route 220 through the store. The route is calculated to be an efficient route through the store, such as a shortest route or a quickest route, and as such, benefits a shopper in navigating an efficient path through the store to each product in the set of sought products 202.

Thus it is a primary function of the route calculator 212 to calculate an efficient route through a store via each and every one of the products in the sought product set 202. Additionally, in accordance with the present invention, the route calculator 212 is operable to include locations of products in the set of recommended products 210 as waypoints along the route 220 such that the route 220 also passes each of the products in set of recommended products 210. A physical location of each of the recommended products 210 is determined with reference to the store product map 214. Preferably, and as is described below with respect to FIG. 4d, products in the set of recommended products 210 are excluded from the route if they have a physical location that is unacceptably far from any point along an efficient route through a store via each and every one of the products in the sought product set 202. Such recommended products, if added as waypoints along the route 220, would cause an unacceptable deviation of the shopper following the route 220 such that the route may not be followed by the shopper. The level of acceptability of distance from the efficient route can be configured, such as by defining a maximum acceptable threshold distance, or any similar technique as will be apparent to those skilled in the art.

FIG. 2b is a flowchart of a method of the store routing system 200 of FIG. 2a in accordance with a preferred embodiment of the present invention. Initially, at step 250, the analytics engine 204 identifies the set of recommended products 210 based on the set of sought products 202. At step 252 the method calculates a route through the store via a location of each of the sought products 202 including locations of products in the set of recommended products 210 as waypoints along the route 220 such that the route 220 also passes products in set of recommended products 210.

Thus the store routing system provides a shopper with a route through the store to a set of sought products 202. The analytics engine discerns recommended products 210 for the shopper based on the set of sought products 202. Locations of each of the recommended products 210 are included as waypoints in the route to the sought products 202. In this way the shopper is presented with additional relevant products and the store increases the opportunity to cross-sell or up-sell products by the shopper being directed to the recommended products in addition to the sought products.

Figure 3A:
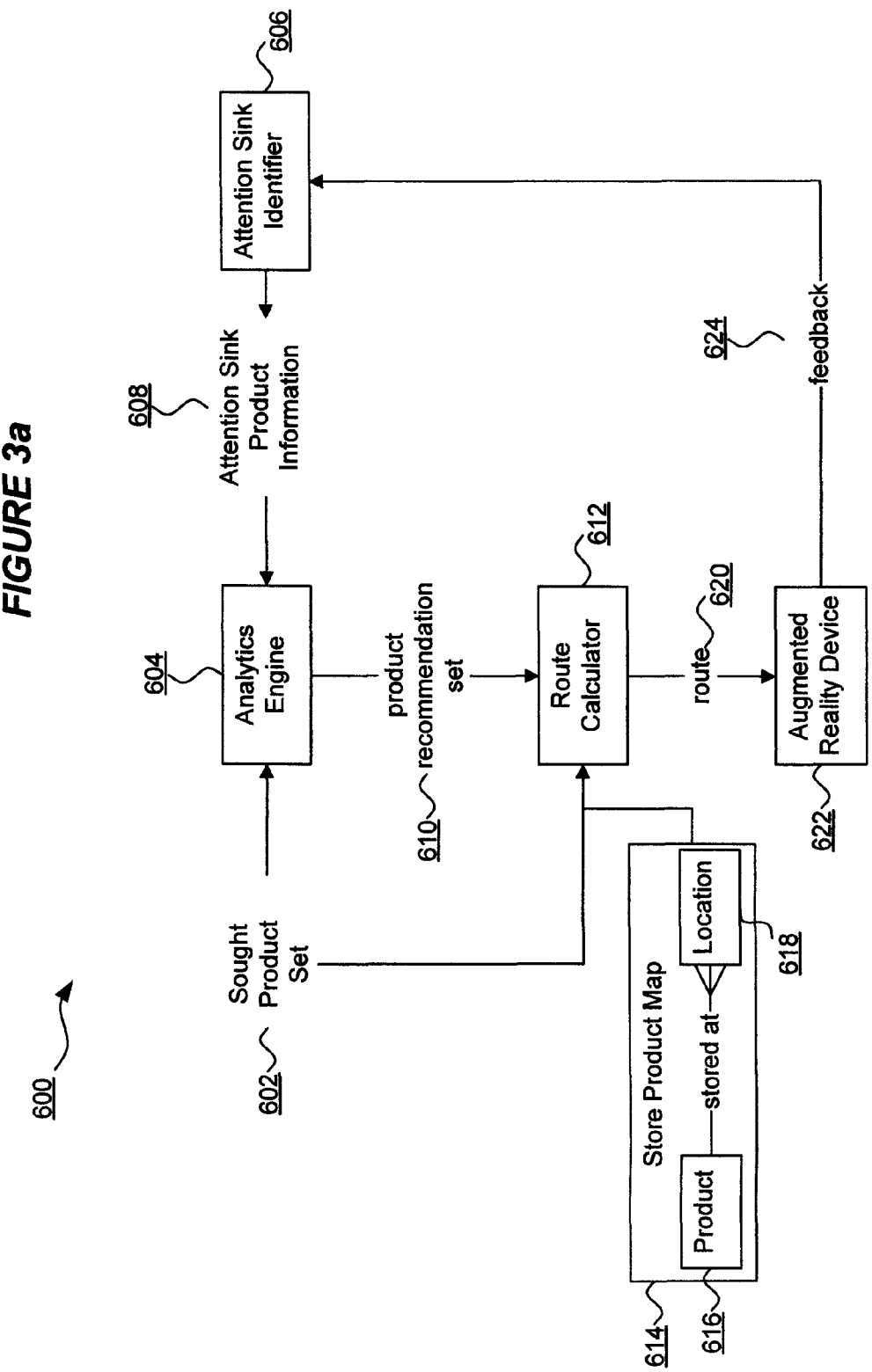
FIG. 3a is a block diagram of an arrangement of a store routing system for guiding a shopper in a shopping store including an augmented reality device for presenting a route to the shopper in accordance with an embodiment of the present invention.

FIG. 3a is a block diagram of an arrangement of a store routing system 600 for guiding a shopper in a shopping store including an augmented reality device 622 for presenting a route 620 to the shopper in accordance with an embodiment of the present invention. Many of the features of FIG. 3a are identical to those described above with respect to FIG. 2a and a description of these features will not be repeated here. FIG. 3a further includes an attention sink identifier 606.

The attention sink identifier 606 comprises an apparatus or generalized programmable device and appropriate programming logic for generating product information 608 relating to one or more products consuming a shopper's attention. The attention sink product information 608 generated by the attention sink identifier 606 is based on feedback 624 received from the augmented reality device 622 relating to product information that is determined to consume a shopper's attention during the shopper's visit in as store. The augmented reality device 622 is operable to provide such feedback 624 based on the insight of the device 622 into a current view of a shopper in the store using a camera. For example, where the augmented reality device 622 can provides feedback 624 to the attention sink identifier such that the identifier 602 can determine that a shopper's attention is consumed by a particular product in the store. Such a determination can be made based on detecting that the shopper is looking at, focusing on or interacting with the product. A similar approach can be used where the shopper's attention is consumed by other items or information in store. For example, product information consuming a shopper's attention can include notices, posters, signage, advertisements, magazines, vouchers, promotional media, items in shopping carts of other shoppers, recipe cards, shopping lists, product or brand logos, motifs, taglines and catchphrases. The feedback 624 is provided, and the attention sink identifier 606 is operable, while the shopper is present in the store such as while the shopper is navigating the route 620 calculated by the route calculator 612 via each of the sought products 602.

Various technologies and techniques can be used to effectively determine product information that may consume the attention of a shopper. Information relating to a prolonged or momentary viewing by the shopper of certain product information can constitute product information consuming the shopper's attention. This can include glancing, for a certain period of time, at a particular product logo as can be detected by the augmented reality device that reflects a current view of the shopper. Alternatively, interacting with a product or materials identifying one or more products can identify such product information. Such interaction is identifiable by the augmented reality device via a camera, or alternatively identifiable using a communication mechanism between the augmented reality device and the interacted product such as a radio frequency identification (RFID) tag associated with the product or materials. The use of eye tracking technology to determine the focus of a shopper's attention can be employed to specifically determine which aspects of the store consume the shopper's attention.

The attention sink product information 608 can include information relating to products on multiple levels and from multiple contexts. Specific products can be identified in the product information 608, or alternatively, brands or manufacturers of product can be identified in the product information 608. Further, classes, types or categories of product can be identified in the product information 608, such as characterized by the nature of the products themselves (such as dairy products, entertainment products, haberdashery products) or by other characteristics of the products (such as their presence in a clearance bin indicating an interest in clearance products).

In the embodiment of FIG. 3a, the analytics engine 604 is adapted to be operable to generate a set of recommended products 610 based on the set of sought products 602 and the attention sink product information 608. For example, the analytics engine 604 uses associations between product information 608 such as logos, brands or product names to identify relevant recommended products to be added to the set of recommended products 610. The analytics engine 604 can continually receive attention sink product information 608 from the attention sink identifier 606 based on feedback 624 received from the augmented reality device. The analytics engine 604 can therefore continually update the set of recommended products 610. Accordingly, in the embodiment of FIG. 3a, the route calculator 612 can continually recalculate the route 620 based on the sought product set 602 and the set of recommended products 610 to reflect changes to the set of recommended products 610.

The attention sink identifier 606 and the augmented reality device 622 are illustrated as separate. It will be apparent to those skilled in the art that the attention sink identifier 606 can conveniently constitute an integral feature of the augmented reality device 622 such as a software application executing on the augmented reality device 622.

Figure 3B:
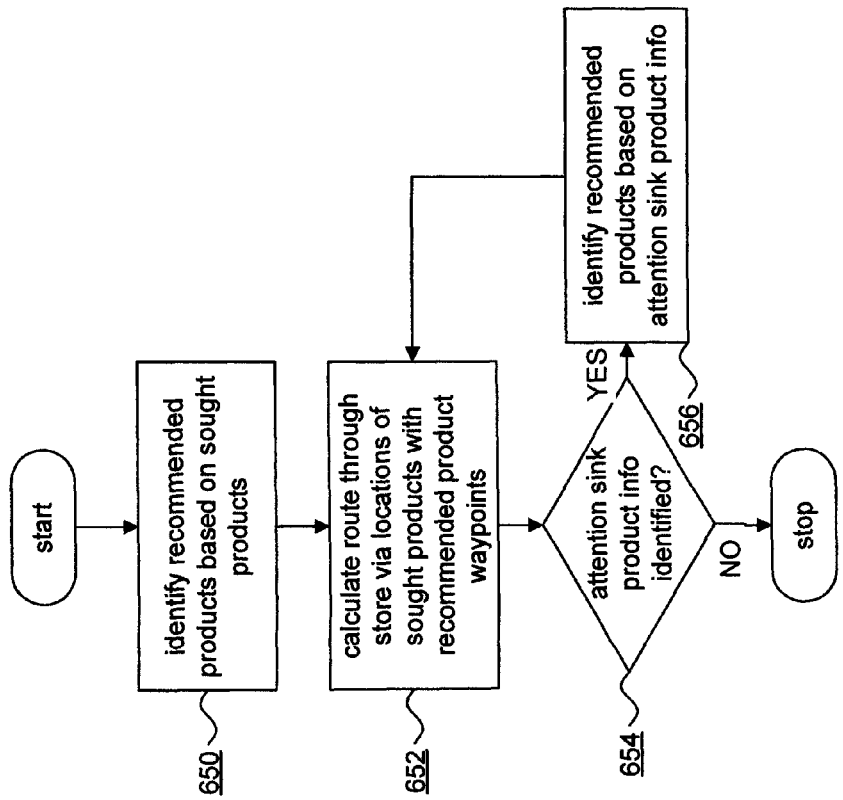
FIG. 3b is a flowchart of a method of the store routing system of FIG. 3a in accordance with an embodiment of the present invention.

FIG. 3b is a flowchart of a method of the store routing system 600 of FIG. 3a in accordance with an embodiment of the present invention. Initially, at step 650, the analytics engine 604 identifies the set of recommended products 610 based on the set of sought products 602. At step 652, the method calculates a route through the store via a location of each of the sought products 602, including locations of products in the set of recommended products 610, as waypoints along the route 620, such that the route 620 also passes products in set of recommended products 610. At step 654, the method determines whether attention sink product information 608 is identified by the attention sink identifier 606 based on feedback 624 from the augmented reality device 622. In response to attention sink product information 608 being identified, the analytics engine 604 dynamically identifies recommended products 610 based additionally on the attention sink product information 608 at step 656, and the method returns to step 652 to dynamically calculate a new route.

Thus product information 608 can be determined to consume the attention of a shopper. Products related to such product information 608 are used by the analytics engine 604 in the identification of recommended products 610. In this way, product information 608 consuming a shopper's attention during the shopper's visit to the store, such as impromptu speculative attention given to product information or acts of browsing, sampling, riffling or foraging by the shopper, dynamically influence the identification by the analytics engine 604 of recommended products 610.

The arrangements of FIG. 2a and FIG. 3a are such as to include an augmented reality device 222, 622 as an integral part of the routing system 200, 600. In one embodiment, the routing system 200, 600 is implemented entirely within the augmented reality device 222, 622, including an apparatus or generalized programmable device and appropriate programming logic to constitute each of the elements of the routing system 200, 600 within the augmented reality device 222, 622. Alternatively, each or any of the elements of the routing system 200, 600 can reside outside and in communication with the augmented reality device 222, 622, including the analytics engine 204, 604, the route calculator 212, 612, the attention sink identifier 606, and the store product map 614. In a further alternative, the store routing system 200, 600 can be without such an augmented reality device 222, 622, and the store routing system 200, 600 can instead be in communication with an augmented reality device 222, 622. In such an arrangement, the augmented reality device 222, 622 provides augmented reality facilities including a camera for obtaining a current view of a shopper, functions to determine (or to gather information to determine) a current location and orientation of the augmented reality device 222, 622, and a display for presenting a route to the shopper in conjunction with a representation of a current view of the shopper in a store.

Figure 4A:
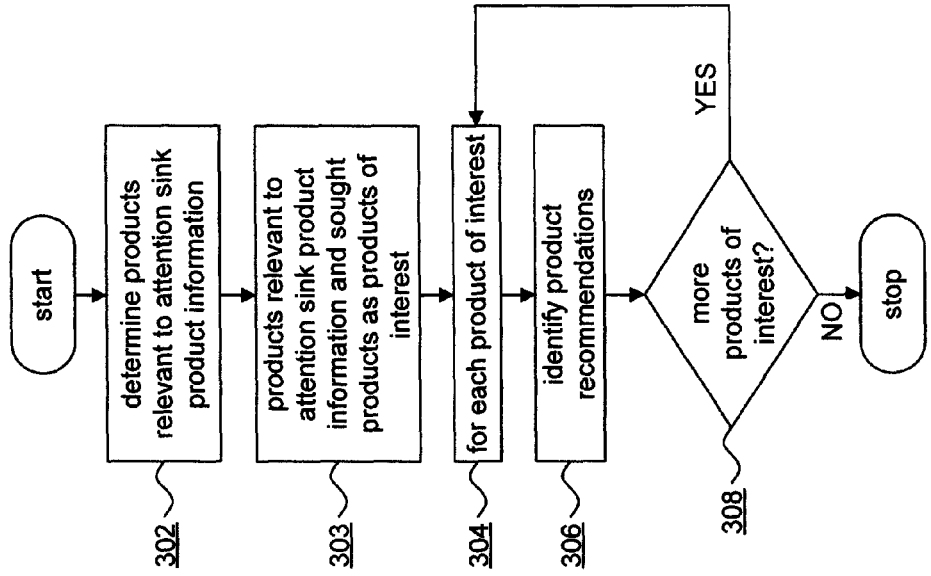
FIG. 4a is a flowchart of a method of the analytics engine of FIG. 3a in accordance with an embodiment of the present invention.

FIG. 4a is a flowchart of a method of the analytics engine of FIG. 3a in accordance with an embodiment of the present invention. At step 302, the analytics engine 604 determines products relevant to the attention sink product information 608. At step 303, the analytics engine receives the set of sought product 602 which, together with the products determined to be relevant to the attention sink product information 608, constitutes products of interest. At step 304, the method initiates an iteration through each of the products of interest. At each iteration, the method identifies at step 306 product recommendations using techniques such as those described above with respect to FIG. 2a. At step 308, the method returns to step 304 to process remaining products of interest.

Figure 4B:
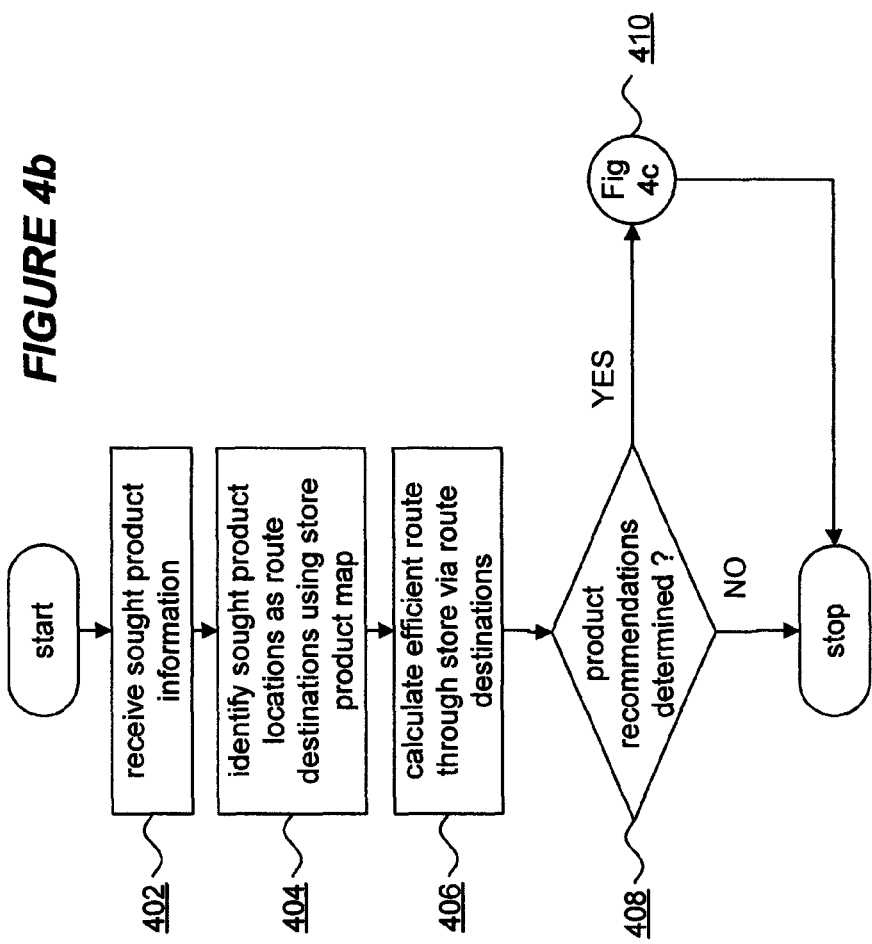

FIGS. 4b, 4c and 4d together are a flowchart of a method of the route calculator 612 of FIG. 2a or FIG. 3a in accordance with an embodiment of the present invention. At step 402, the route calculator 212, 612 receives the set of sought products 202, 602. At step 404, the route calculator 212, 612 identifies a physical location for each of the products in the set of sought products using the store product map 214, 614. The physical locations are recorded as route destinations for the route calculator 212, 612. At step 406, the route calculator 212, 612 calculates an efficient route 220, 620 through the store via the recorded route destinations corresponding to the sought products 202, 602 using route calculation techniques or algorithms commonly known in the art. The route calculated at step 406 is efficient in the sense that it can be one of a quickest or shortest route through the store, such as can be configured by the shopper or other user of the store routing system. At step 408, the method determines if a set of recommended products 210, 610 is available to the route calculator 212, 612. If so, the method proceeds to the method of FIG. 4c at step 410.

In the method of FIG. 4c, at step 412, an iteration is initiated through each of the products in the set of recommended products 210, 610. At step 414, a physical location of a current recommended product is determined with reference to the store product map 214, 614. At step 416, the current recommended product is added as a waypoint for the route 220, 620, if it is not located unacceptably far from any point along the efficient route 220, 620 calculated at step 406. Step 416 can be embodied in accordance with the flowchart of FIG. 4d. Finally, at step 418, the iteration through the set of recommended products 210, 610 proceeds to the next recommended product.

Referring now to FIG. 4d, at step 420, the method determines if a physical location of a current recommended product is unacceptably far from any point along the efficient route 220, 620 calculated at step 406. A negative determination at step 420 leads to step 422 at which the physical location of the current recommended product is added as a waypoint to the current route 220, 620. The route is then recalculated to account for the additional waypoint at step 424.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A store routing system for guiding a shopper in a store, comprising:
   a storage storing a store product map comprising location information for products available at the store;

an analytics engine for identifying one or more recommended products for the shopper based on a set of one or more sought products; and a route calculator for:

calculating a route through the store to a location of each of the sought products based on the store product map and for including a waypoint in the route corresponding to a location of each of the one or more recommended products;

obtaining a current view of the shopper in the store, the current view obtained via a camera held by the user; and presenting, to the shopper, the route in conjunction with a representation of the current view of the shopper in the store.

2. The store routing system of claim 1, further comprising:

an attention sink identifier for generating product information relating to one or more products consuming the shopper's attention; and the analytics engine further for identifying the one or more recommended products based additionally on the one or more products consuming the shopper's attention as the shopper navigates the route in the store.

3. The store routing system of claim 2, wherein the route calculator further evaluates a distance between the location of each of the one or more recommended products from any point along the route;

determines a threshold distance associated with the waypoint, wherein the threshold distance indicates an unacceptable deviation from the route wherein the shopper might not follow the route while navigating the route through the store; and excludes the waypoint in the route corresponding to the location of one or more recommended products evaluated as being located beyond the threshold distance from any point along the route.

4. The store routing system of claim 2, wherein the one or more recommended products are relevant to one or more products in the set of sought products.

5. The store routing system of claim 4, wherein the one or more recommended products comprise products complementary to, supplementary to, upgraded from, or enhanced from one or more products in the set of sought products.

6. The store routing system of claim 2, further comprising an augmented reality device, wherein the attention sink identifier receives feedback from the augmented reality device, the feedback comprising one or more of: product information viewed by the shopper; a product the shopper interacts with; and materials the shopper interacts.

7. The store routing system of claim 2, wherein the attention sink identifier is a feature of the augmented reality device.

8. The store routing system of claim 2, wherein the store routing system is integrated with an augmented reality device.

9. The store routing system of claim 1, further comprising an augmented reality device, wherein the route calculator further sends the route comprising the waypoints to the augmented reality device for presenting the route to the shopper in conjunction with the representation of the current view of the shopper in the store.

\* \* \* \* \*